D. S. Storr,
Miter Box.

Nº 6,767.          Patented Oct. 2, 1849.

AM. PHOTO-LITHO. CO. N.Y. (OSBORNE'S PROCESS.)

UNITED STATES PATENT OFFICE.

DENNIS S. STOW, OF COHOES, NEW YORK.

MACHINERY FOR MITER-SAWING.

Specification of Letters Patent No. 6,767, dated October 2, 1849.

*To all whom it may concern:*

Be it known that I, DENNIS S. STOW, of Cohoes, county of Albany, and State of New York, have invented a new and useful Machine for Carpentry and Joiner Work, which I call Stow's Bevel-Sawing Engine; and I declare that the following specification, with the drawings attached to the same and forming part thereof, gives a full and accurate description of my invention.

Figure 1:
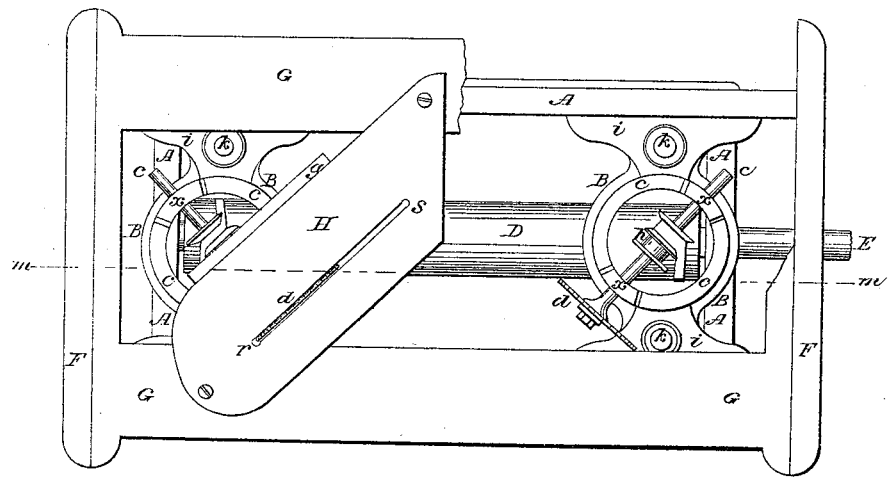
Figure 2:
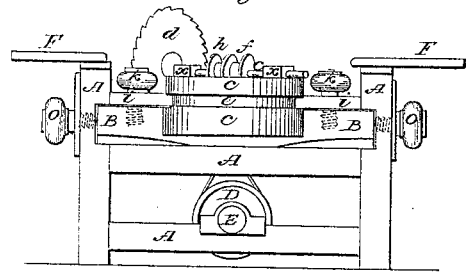
Figure 3:
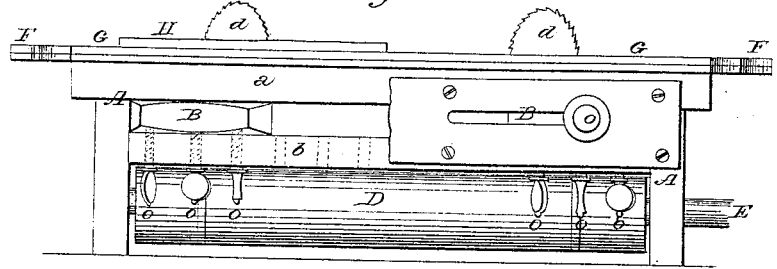

In the drawings Figure 1 represents the plan of the machine with a part of the carriage and one of the guide blocks removed to show the apparatus underneath. Fig. 2 represents an end view with the carriage removed. Fig. 3 a portion of the machine with a portion of the external side covering removed.

The same letters in the respective figures refer to the same parts of the apparatus.

A, A, is a strong frame or table of suitable dimensions for the work to be done thereon.

B, B, are two blocks, with a concentric circular opening through each, lying between the two sills $a$, $b$ Fig. 3 and capable of being moved from one end of the frame to the other.

C C Figs. 1 and 2 is a circular ring lying horizontally upon block B having its lower part fitted into a cylindrical groove made therein, and capable of a rotary motion in said groove. In the outer surface of this ring and directly above the lower part just described there is a groove $e$ Fig. 2 of no great depth cut therein.

$i$ is a flat piece of wood or metal, lying between the frame A and the ring C, its inner edge just fitting into the groove $e$. The thumbscrew $k$ passes through it into the block below, by which whenever the ring C is set in any given position $i$ can be screwed down firmly to the lower edge of the groove $e$ and thus C firmly clamped.

On the top of this ring and in the line of any diameter thereto, there is a metal spindle or arbor $c$, passing through boxes $x$ $x$ secured to the ring, and supporting at its extremity outside of the ring a circular saw $d$. Within the ring the arbor is the axis to a band pulley $f$, and a pulley with a deep rectangular groove cut therein; this is the guide pulley. The arbor or axis is permitted to have a certain extent of motion backward and forward in the line of its axis, through its boxes $x$ $x$.

The above arrangement of circular ring &c. applies to both blocks B B, each being similar in arrangement. These arbors with their jaws are operated by means of a drum D placed underneath the blocks B, B, and extending from end to end of the frame A A. Bands pass around the drum and over the band pulleys $f$, $f$, the drum itself being driven by any power applied to the shaft thereof E.

Above the machinery described and resting upon the top of the frame or table, is a horizontal frame F, to support and guide a sliding carriage G in its movement across the frame. This table is to support the stuff to be sawed. Upon this table and forming part of it, there is secured by screws, so arranged as to allow of the change of their position two guide blocks, one of which H is shown in Figs. 1 and 3, the block is pierced with a slit by means of which it can be dropped over the saw; the saw projecting a large proportion of its semi-diameter through and above it. The slit is just wide enough for the free passage of the saw, and long enough to allow the transit of the saw from one side of the frame to the other, or so far as may be necessary to execute the work in hand, and at whatever angle with the axis of the frame the saw may be fixed. In the drawings the saw is arranged at an angle of 45 degrees to cut miters.

On one side of the guide block a flat bar of metal $g$ is attached having its lower edge extended a short distance below the bottom face of this block. The thickness of this edge is adapted to the groove of the guide pulley $h$ so as to move freely in the same. This is the guide-bar whose object is to keep the arbor $c$ from sliding backward and forward in the direction of its axis, also to keep the direction of the saw parallel with the line of the guide bar.

The blocks B B have been described as movable backward and forward between the sills $a$ and $b$. To fix them at any desired point, set screws $o$, $o$, are provided screwing into matrices prepared at short intervals along the length of the sill $b$, shown by dotted lines in Fig. 3.

The provisions for change of position of the saws, hitherto noted preserve them in the same vertical position so that their cuts would be plain bevel or miter cuts. But as it might be desirable at times to fit oblique bevel or miter joints, provision is made for this, by giving to that part of blocks B B, which lie between the sills *a—a* a circular or arching form, as shown in the drawings Fig. 3, so that by depressing the one end and elevating the other, the saw may be inclined from the perpendicular some degrees. The blocks B B are retained in their desired position by the use of two or three set screws as shown in the drawings.

The operation of the machine is as follows—The material to be operated on being placed on the sliding carriage with its edge on the line *m, m,* Fig. 1 and held or secured firmly there; the machine is set in motion and the table with the material moved forward (downward in the drawing). It will be manifest that as the guide *g* moves forward it will by its action in the groove of the pulley *h,* press it and consequently the saw inward toward the center of the machine, keeping the saw parallel with the edge of the guide and advancing in the slit from *r* to *s* as the carriage and material progress forward. This double motion carrying the saw obliquely and accurately through the stuff at any angle to which the saw might be set. Thus it will be seen that the saws being set with their planes vertical and at any desired angles to each other, any desired bevel may be cut at the ends of the stuff so as to suit every variety of plain framing. Or that by canting the saws or either of them obliquely as described, oblique bevels may be cut to various patterns.

When the position of the saws is changed, the position of the guide block is also to be changed by the screws with which it is provided for that purpose.

I propose to apply this machine for various purposes in carpentry and joiner work, not limiting myself to the operations referred to above; but employing it for all kinds of work to which it may be deemed applicable, either by the use of saws or by substituting cutters of suitable kinds for the purpose of cutting oblique angled joints as above described, or oblique angled tenons, &c. Neither do I confine myself to cutting wood, but extend its use to cutting all kinds of materials, that can be operated upon by saws or cutters.

I claim—

1. The arrangement of circular saws or cutters revolving vertically, secured to a bed or block having a horizontal circular motion, the saws or cutters being fitted to arbors moving freely backward and forward in the direction of their axes, this motion of the axes being governed by guide bars attached to blocks capable of being shifted, to any angle with the line of the direction of the stuff to be operated on, these blocks being attached to the moving carriage for the said stuff, and these guide bars operating in grooved pulleys on the axes of the said saws or cutters keeping them, the saws and cutters, operating in a line parallel with the said bars, the result of which is that as the stuff to be sawed with the carriage on which it is placed, advances on the machine, the movement of the saw is in the diagonal line indicated by the direction of the guide bar, and the cutting of the material conformable thereto, so that at whatever angle the bar is placed with the direction of the material operated on, at such angle will the saw cut it.

2. I claim the combination of mechanical apparatus in the above specification set forth by which oblique-angled joints, tenons, or work of a similar character can be done, operating if desired upon both the ends of a piece of stuff at once, and making in that case, similar or dissimilar joints or cuts at the two ends at one operation.

DENNIS S. STOW.

Witnesses:
ROB. PATRICK DE WITT,
JAMES B. SANDERS.